US011457402B2

(12) United States Patent
Basu Mallick et al.

(10) Patent No.: US 11,457,402 B2
(45) Date of Patent: Sep. 27, 2022

(54) METHOD AND APPARATUS FOR DISCOVERY AND ACCESS OF RESTRICTED LOCAL SERVICES FOR UNAUTHENTICATED UES

(71) Applicant: Lenovo (Singapore) Pte. Ltd., New Tech Park (SG)

(72) Inventors: Prateek Basu Mallick, Langen (DE); Joachim Löhr, Wiesbaden (DE); Genadi Velev, Darmstadt (DE); Andreas Kunz, Ladenburg (DE); Ravi Kuchibhotla, Gurnee, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 576 days.

(21) Appl. No.: 16/058,992

(22) Filed: Aug. 8, 2018

(65) Prior Publication Data
US 2019/0053139 A1  Feb. 14, 2019

Related U.S. Application Data

(60) Provisional application No. 62/543,173, filed on Aug. 9, 2017.

(51) Int. Cl.
*H04W 48/16* (2009.01)
*H04W 48/12* (2009.01)
(Continued)

(52) U.S. Cl.
CPC ........... *H04W 48/16* (2013.01); *H04W 12/08* (2013.01); *H04W 48/02* (2013.01); *H04W 48/12* (2013.01);
(Continued)

(58) Field of Classification Search
CPC ...... H04W 12/08; H04W 48/16; H04W 48/18
See application file for complete search history.

(56) References Cited

U.S. PATENT DOCUMENTS

2010/0159899 A1* 6/2010 Horn .................. H04W 12/088
455/414.1
2010/0216464 A1* 8/2010 Funnell ................ H04W 36/24
455/434
(Continued)

FOREIGN PATENT DOCUMENTS

EP   2830361 A1   1/2015

OTHER PUBLICATIONS

SA WG2, New SID: Study on System enhancements for Provision of Access to Restricted Local Operator Services by Unauthenticated UEs, 3GPP TSG SA Meeting #76, Jun. 7-9, 2017, West Palm Beach, Florida, USA.
(Continued)

*Primary Examiner* — Shripal K Khajuria
(74) *Attorney, Agent, or Firm* — Loppnow & Chapa; Matthew C. Loppnow

(57) ABSTRACT

A determination can be made as to whether a mobile equipment has valid credentials for accessing an available public land mobile network. Availability of restricted operator services access support can be detected. A cell of a public land mobile network that supports restricted operator services access can be selected as a serving cell if restricted operator services access support is available and the mobile equipment does not have valid credentials for accessing the available public land mobile network. An attach procedure can be performed for restricted operator services using the public land mobile network of the selected cell as a selected public land mobile network.

20 Claims, 8 Drawing Sheets

(51) Int. Cl.
*H04W 76/27* (2018.01)
*H04W 76/10* (2018.01)
*H04W 12/08* (2021.01)
*H04W 48/02* (2009.01)
*H04W 48/18* (2009.01)
*H04W 60/00* (2009.01)
*H04W 12/06* (2021.01)
*H04W 84/04* (2009.01)

(52) U.S. Cl.
CPC ........... *H04W 48/18* (2013.01); *H04W 60/00* (2013.01); *H04W 76/10* (2018.02); *H04W 76/27* (2018.02); *H04W 12/06* (2013.01); *H04W 84/042* (2013.01)

(56) References Cited

U.S. PATENT DOCUMENTS

| | | | | |
|---|---|---|---|---|
| 2012/0263039 | A1* | 10/2012 | Ou | H04W 28/0205 370/235 |
| 2015/0079938 | A1* | 3/2015 | Jung | H04W 48/20 455/411 |
| 2015/0281966 | A1* | 10/2015 | Griot | H04W 12/35 726/5 |
| 2018/0324672 | A1* | 11/2018 | Kang | H04W 12/06 |

OTHER PUBLICATIONS

3GPP, 3rd Generation Partnership Project; Technical Specification Group Core Network and Terminals; Non-Access-Stratum (NAS) functions related to Mobile Station (MS) in idle mode (Release 15), 3GPP TS 23.122 V15.0.0 (Jun. 2017), Valbonne, France.

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 15), 3GPP TS 23.401 V15.0.0 (Jun. 2017), Valbonne, France.

3GPP, 3rd Generation Partnership Project; Technical Specification Group Services and System Aspects; System Architecture for the 5G System; Stage 2 (Release 15), 3GPP TS 23.501 V1.2.0 (Jul. 2017), Valbonne, France.

3GPP, 3rd Generation Partnership Project; Technical Specification Group Services and System Aspects; 3GPP System Architecture Evolution (SAE); Security architecture (Release 14), 3GPP TS 33.401 V14.3.0 (Jun. 2017), Valbonne, France.

3GPP, 3rd Generation Partnership Project; Technical Specification Group Radio Access Network; Evolved Universal Terrestrial Radio Access (E-UTRA); User Equipment (UE) procedures in idle mode (Release 14), 3GPP TS 36.304 V14.3.0 (Jun. 2017), Valbonne, France.

3GPP, 3rd Generation Partnership Project; Technical Specification Group Radio Access Network; Evolved Universal Terrestrial Radio Access (E-UTRA); Radio Resource Control (RRC); Protocol specification, (Release 14), 3GPP TS 36.331 V14.3.0 (Jun. 2017), Valbonne, France.

"3rd Generation Partnership Project; Technical Specification Group Services and System Aspects; Study on Provision of Access to Restricted Local Operator Services by Unauthenticated UEs; Stage 1 (Release 15)", 3GPP Standard; Technical Report; 3GPP TR 22.820, 3rd Generation Partnership Project (3GPP), Mobile Competence Centre . 650, Route Des Lucio Les ; F-06921 Sophia-Antipolis Cedex ; France, vol. SA WG1, No. V15.0.0, Mar. 17, 2017.

Motorola Mobility et al: "Update to Solution 9 to enhance the congestion control description", 3GPP Draft S2-186938-PARLOS-SOL9 V03, 3rd Generation Partnership Project (3GPP), Mobile Competence Centre; 650, Route Des Lucioles ; F-06921 Sophia-Antipolis Cedex; France, vol. SA WG2, No. Vilnius, Lithuania; Jul. 2-Jul. 6, 2018; Jul. 1, 2018.

Motorola Mobility et al: "Architectural assumptions for restricted operator services", 3GPP Draft; S2-175913 PARLOS Security V03, 3rd Generation Partnership Project (3GPP), Mobile Competence Centre; 650, Route Des Lucioles ; F-06921 Sophia-Antipolis Cedex; France, vol. SA WG2, No. Sophia Antipolis, France; Aug. 21-Aug. 25, 2017, Aug. 15, 2017.

Delucchi, International Search Report, International Application No. PCT/US2018/045887, European Patent Office, Rijswijk, NL, dated Oct. 12, 2018.

* cited by examiner

```
--ASN1START

SystemInformationBlockType2 ::=    SEQUENCE {
    ac-BarringInfo                     SEQUENCE {
        ac-BarringForEmergency             BOOLEAN,
        ac-BarringForPARLOS                BOOLEAN,
        ac-BarringForMO-Signalling         AC-BarringConfig    OPTIONAL, -- NEED OP
        ac-BarringForMO-Data               AC-BarringConfig    OPTIONAL, -- NEED OP
    }                                                          OPTIONAL, -- NEED OP
}

--ASN1STOP
```

*FIG. 8*

METHOD AND APPARATUS FOR DISCOVERY AND ACCESS OF RESTRICTED LOCAL SERVICES FOR UNAUTHENTICATED UES

BACKGROUND

1. Field

The present disclosure is directed to a method and apparatus for discovery and access of restricted local services for unauthenticated UEs.

2. Introduction

Presently, wireless communication devices, such as User Equipment (UE), communicate with other communication devices using wireless signals. UEs use physical or virtual Subscriber Identity Modules (SIM) and other similar cards to access and operate on a service provider's cellular network corresponding to the SIM. However, if a network is not available for the service provider that issued the SIM or if a SIM is not present in a UE, the UE may not be able to access all services of an available cellular network of a different service provider, such as a local operator, as there are currently no mechanisms that allow a UE to access restricted local operator services.

In particular, there are no current solutions for Provision of Access to Restricted Local Operator Services by Unauthenticated UEs (PARLOS) discovery, network/Public Land Mobile Network (PLMN) selection, and subsequent access control for managing the restricted local services. For example, current registration procedure in Evolved Packet System (EPS) does not allow a registration attempt without a valid Universal Subscriber Identity Module (USIM). Further, the concept of restricted local access for unauthentic Mobile Stations (MSs), also known as UEs, is new and therefore all aspects related to service discovery, registration, access control at a base station, such as an eNB, a gNB, or other base station or access point, and appropriate Mobility Management Entity (MME) selection are new and unsolved.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 8 is an example illustration of a SystemInformationBlockType2 information element according to a possible embodiment;

DETAILED DESCRIPTION

Embodiments provide a method and apparatus for discovery and access of restricted local services for unauthenticated UEs. Some embodiments can provide for RLOS, such as PARLOS, discovery, network/PLMN selection, and subsequent access control for managing the restricted local services. For example, some embodiments can provide for RLOS discovery, such as determination of PARLOS support by a network. Some embodiments can also provide for RLOS registration. Some embodiments can additionally provide for access control for RLOS.

According to a possible embodiment, a determination can be made as to whether a mobile equipment has valid credentials for accessing an available public land mobile network. Availability of restricted operator services access support can be detected. A cell of a public land mobile network that supports restricted operator services access can be selected as a serving cell if restricted operator services access support is available and the mobile equipment does not have valid credentials for accessing the available public land mobile network. An attach procedure can be performed for restricted operator services using the public land mobile network of the selected cell as a selected public land mobile network.

According to another possible embodiment, a restricted operator services access request from a mobile station can be received at a network entity of a public land mobile network. A determination can be made as to whether restricted operator services access is available on the public land mobile network for the mobile station. Restricted operator services access can be granted on the public land mobile network to the mobile station if restricted operator services access is available for the mobile station on the public land mobile network.

Figure 1:
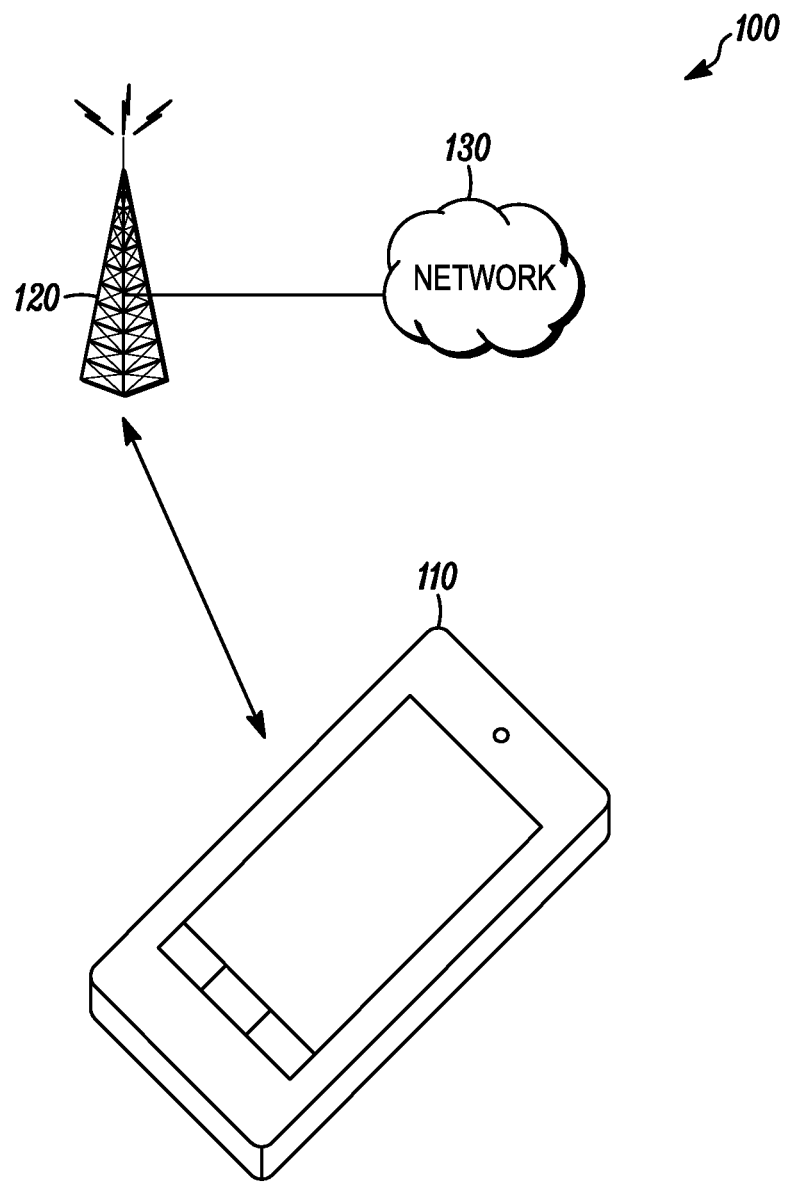
FIG. 1 is an example block diagram of a system according to a possible embodiment.

FIG. 1 is an example block diagram of a system 100 according to a possible embodiment. The system 100 can include a UE 110, a base station 120, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The base station 120 can be a wireless wide area network base station, a NodeB, an enhanced NodeB (eNB), a 5G or New Radio NodeB (gNB), an unlicensed network base station, an access point, or any other base station that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In 3rd Generation Partnership Project (3GPP), the study item in 3GPP document SP-170382 "New SID: Study on System enhancements for Provision of Access to Restricted Local Operator Services by Unauthenticated UEs (PARLOS)" was presented. The document considers 3GPP Technical Specification Group on Service and System Aspects Services subgroup (3GPP SA1) requirements to provide UEs with network access to restricted local operator services even if they are not successfully authenticated. The ability to provide access to local services has been available to U.S. operators on a proprietary basis. However, the wide deployment of Long Term Evolution (LTE) and corresponding introduction of Voice over LTE (VoLTE) creates demand for a standardized mechanism to allow a UE to access these services, such as dialing a particular digit string and/or accessing a captive portal, without necessarily being successfully authenticated for access.

The feature consists in the optional capability to allow unauthenticated UEs to access restricted local operator services based on operator policy and regional regulatory requirements. These requirements are documented in stage 1 specifications listed in clause 2.3 of the SP-170382 document. They address the following areas: identifying an origination to restricted local operator services, such as dialed digits or captive portal; determining Restricted Local Operator Services (RLOS) are available; allowing access to restricted operator services by unauthenticated UEs; charging information collection; and security considerations. Unfortunately, there are no current solutions for unauthenticated UE RLOS, such as PARLOS, discovery, network/Public Land Mobile Network (PLMN) selection, and subsequent access control for managing the restricted local services For RLOS discovery, as defined in 3GPP Technical Specification (TS) 23122-f00, there are a number of situations in which the MS is unable to obtain normal service from a PLMN and must therefore enter limited service state. One situation of entering limited service state can include failure to find a suitable cell of the selected PLMN. Another situation of entering limited service state can include no SIM in the MS. Another situation of entering limited service state can include a "PLMN not allowed" response in a received Location Registration (LR) reject message. Another situation of entering limited service state can include an "illegal MS" or "illegal Mobile Equipment (ME)" response in a received LR reject message. Any SIM in the ME can then be considered "invalid." A MS can include the ME and the SIM. Another situation of entering limited service state can include an "International Mobile Subscriber Identity (IMSI) unknown in Home Location Register (HLR)" response in a received LR reject message. Any SIM in the ME can then be considered "invalid" for non-General Packet Radio Service (GPRS) services. Another situation of entering limited service state can include a "GPRS services not allowed" response in a received LR reject message of a GPRS MS attached to GPRS services only is received. The cell selection state of GPRS MSs attached to GPRS and non-GPRS can depend on the outcome of the location updating. A similar situation can include an "EPS services not allowed" response is received when an EPS attach, tracking area update, or service request is performed. Another situation of entering limited service state can include a Power Saving Mode (PSM) being activated, such as described in 3GPP TS 23.682.

For example, entering limited service state can occur if there is no SIM in the MS, if there is an authentication failure, or if the MS receives an "IMSI unknown in HLR," "illegal ME," or "illegal MS" response to an LR request. Then, there is effectively no selected PLMN, which can be considered a "No SIM" state. In these cases, the states of the cell selection process are such that no PLMN selection information is used. One exception to this is when performing GPRS attach or EPS attach for emergency bearer services. Otherwise, no further attempts at registration on any PLMN are made until the MS is switched off and on again or until a SIM is inserted.

A possible embodiment can provide another exception where the MS, such as a ME if there is no SIM or USIM or if user through a user interface does not wish to use the available SIM subscription, detects that RLOS service is advertised by network and in such a case the states of the cell selection process can be such that the selected PLMN can be a PLMN that advertises RLOS support. If there are more than one such PLMN, then the MS can select one of these PLMNs randomly, based on best radio signal strength, based on user input solicited through a UI, and/or based on other criteria. When performing EPS attach for RLOS services, the PLMN of the current serving cell can be temporarily considered as the selected PLMN.

Figure 2:
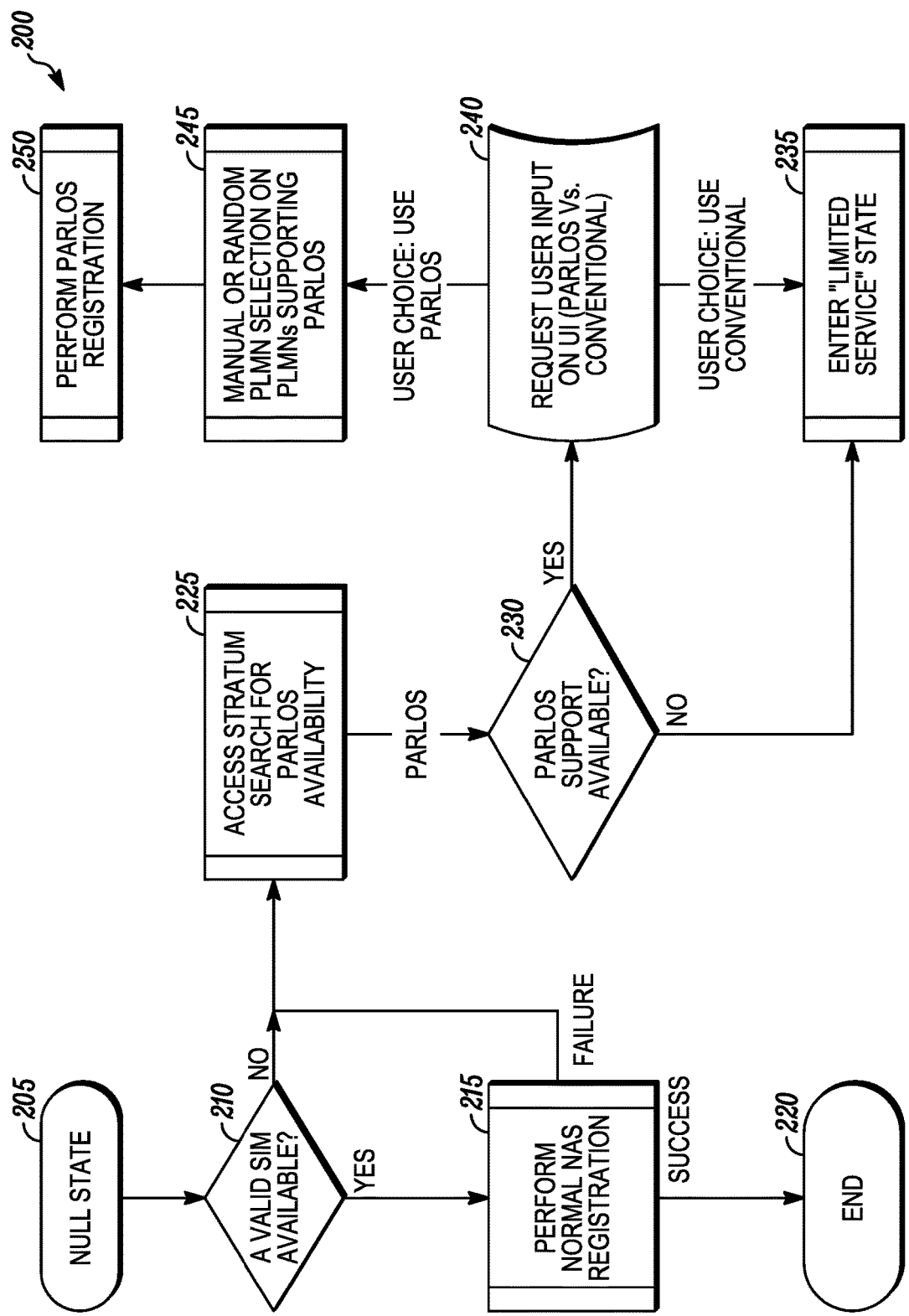
FIG. 2 is an example a flowchart illustrating operation of a wireless communication device according to a possible embodiment.

FIG. 2 is an example a flowchart 200 illustrating operation of a wireless communication device, such as the UE 110, according to a possible embodiment. At 205, a null state can be present. At 210, a determination can be made as to whether a valid SIM is available. At 215, if a valid SIM is available, normal Non-Access Stratum (NAS) registration can be performed. If successful, at 220, the process can end. If a valid SIM is not available or if the NAS registration fails, at 225, an Access Stratum (AS) search can be performed for PARLOS, such as RLOS, availability. If, at 230, PARLOS support is not available, then a limited service state can be entered at 235. If PARLOS support is available, at 240, user input can be requested as to whether to use PARLOS or conventional access. If the user input indicates a choice to use conventional access, the limited service state can be entered at 235. If the user input indicates a choice to user PARLOS, at 245, manual or random PLMN selection can be performed on PLMNs that support PARLOS. After PLMN selection, at 250, PARLOS registration can be performed.

For example, when a valid (U)SIM is not available, the registration attempt(s) have failed, and/or the MS would otherwise enter the limited service state, according to a possible embodiment, a RLOS capable MS can determine if any of the PLMN(s) offer RLOS support. If it is determined that RLOS is supported in one or more of the PLMN(s) then the MS can register for RLOS service. User input to this end can be solicited at this or even at an earlier stage. For example, the UI can display a software function button to check if the user is willing to use RLOS service and it can subsequently switch to manual mode of PLMN selection of displayed PLMNs that support RLOS or display all available PLMNs and mark those supporting RLOS for selection. This can be a list of all PLMNs broadcasted in, for example, System Information Block (SIB) Type1 including PLMNs belonging to a plurality of new/separate/independent cellIdentity(s) as defined in SystemInformationBlockType1 of 3GPP TS 36.331 supporting RLOS.

Figure 3:
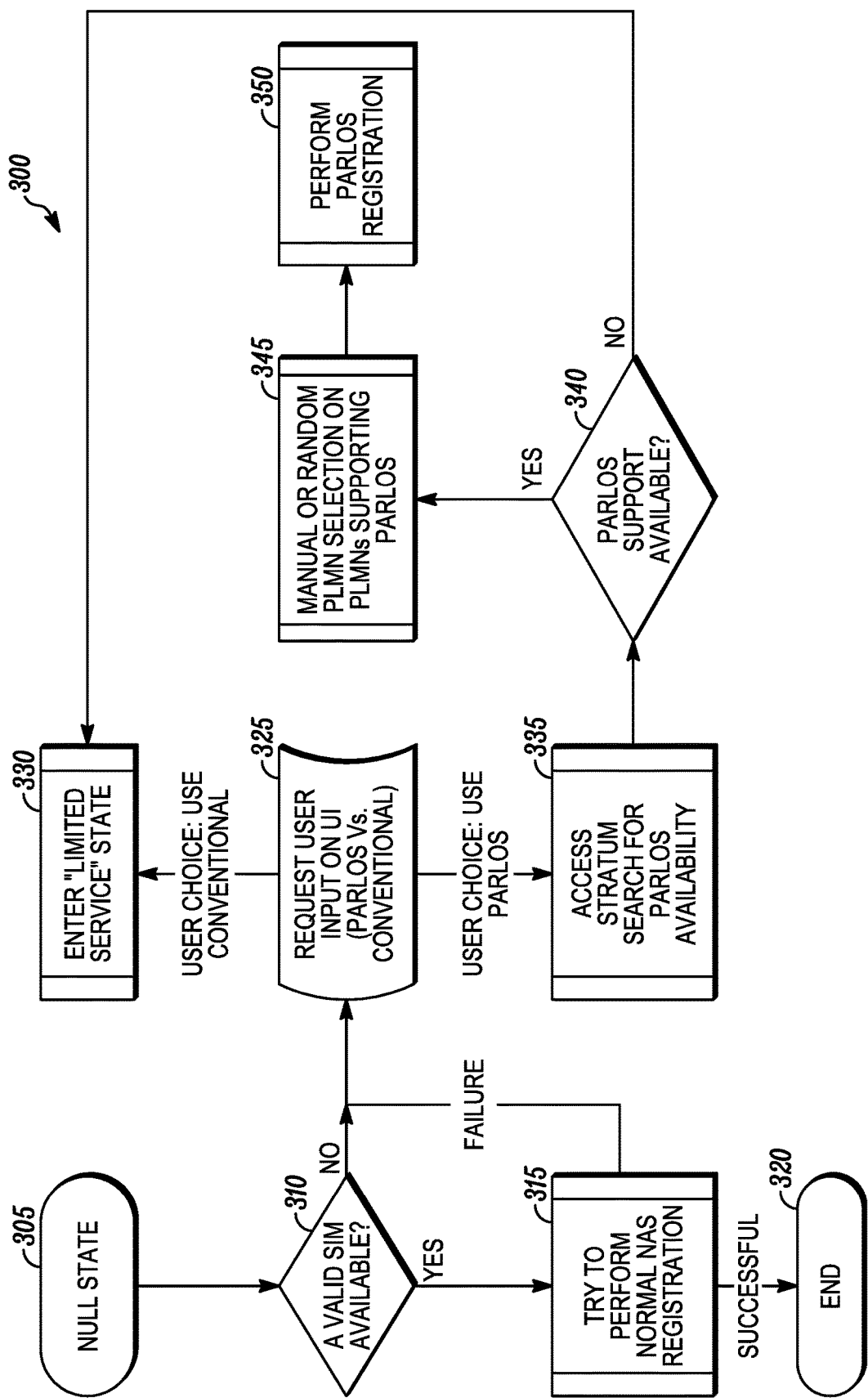
FIG. 3 is an example a flowchart illustrating operation of a wireless communication device according to a possible embodiment.

FIG. 3 is an example a flowchart 300 illustrating operation of a wireless communication device according to a possible embodiment. The flowchart 300 can show the PARLOS, such as RLOS, registration operation with user input solicited at the beginning before the MS goes on to check PARLOS support. At 305, a null state can be present. At 310, a determination can be made as to whether a valid SIM is available. At 315, if a valid SIM is available, an attempt for normal NAS registration can be performed. If successful, at 320, the process can end. If a valid SIM is not available at 310 or if the NAS registration fails at 315, at 325, user input can be requested as to whether to us PARLOS or conventional access. If the user input indicates a choice to use conventional access, the limited service state can be entered at 330. If the user input indicates a choice to user PARLOS, at 335, an AS search can be performed for PARLOS availability. If, at 340, PARLOS support is not available, then a limited service state can be entered at 330. If, at 340, PARLOS support is available, at 345, manual, random, or other PLMN selection can be performed on PLMNs that support PARLOS. After PLMN selection, at 350, PARLOS registration can be performed.

Figure 4:
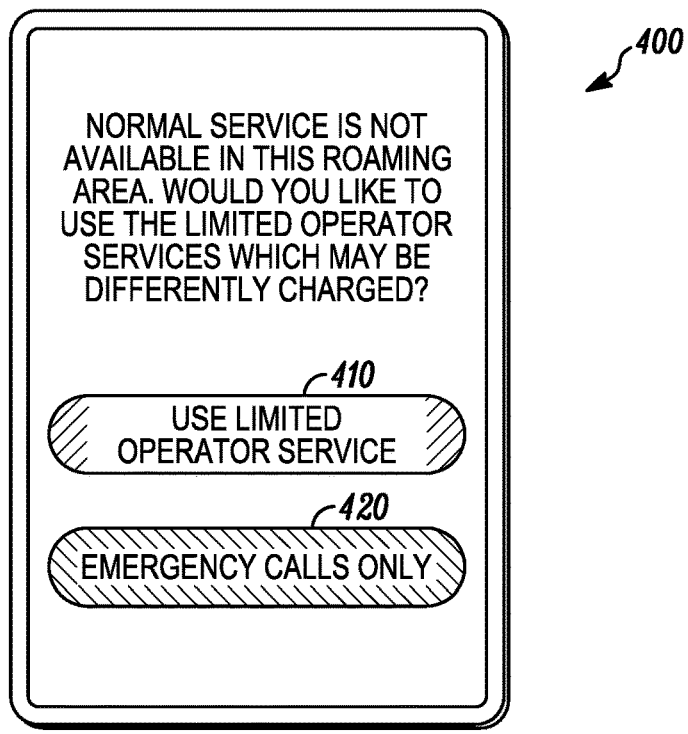
FIG. 4 is an example illustration of a User Interface (UI) according to a possible embodiment.

FIG. 4 is an example illustration of a UI 400 according to a possible embodiment. The UI 400 can be a display on a MS that can solicit for user input for RLOS use. For example, the UI 400 can indicate that normal service is not available in the current roaming area and requests whether the user would like to use limited operator services that may be differently charged. The UI 400 can provide a first option button 410 or other selection input for the user to select to use limited operator service. The UI 400 can also provide a second option button 420 or other selection input for the user to select to only allow the MS to make emergency calls. For example, the user input can be solicited using the UI 400, which can flash some functional buttons corresponding to the user options.

Figure 5:
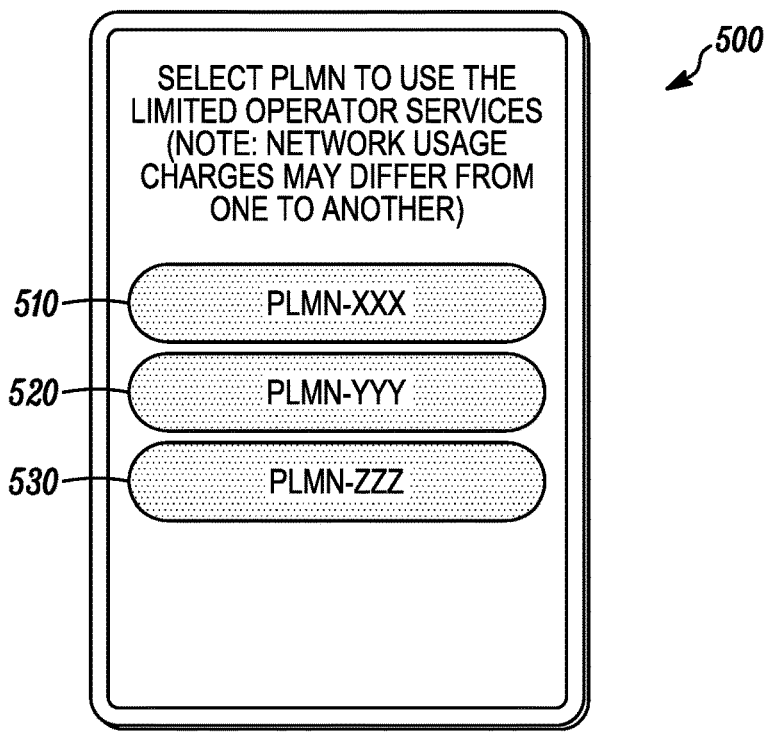
FIG. 5 is an example illustration of a UI according to a possible embodiment.

FIG. 5 is an example illustration of a UI 500 according to a possible embodiment. The UI 500 can be a display on a MS that can solicit manual PLMN selection input for RLOS use. For example, the UI 500 can request the user to select a PLMN to use limited operator services and can inform the user that network usage charges can differ from one PLMN to another PLMN. The UI 500 can provide option buttons 510, 520, and 530 or other input selections for different PLMNs.

According to a possible embodiment for stored information cell selection, the RLOS support information for each cell/frequency/PLMN can be stored in the MS during the cell search and subsequent system information reading for a cell selection/reselection procedure. This information can be directly used during and for the phase of AS search for RLOS availability.

According to a possible embodiment for RLOS capability determination, the MS can already indicate to the MME the RLOS support capability while trying an initial normal ATTACH procedure. According to another possible embodiment for RLOS capability determination, based on the RLOS capability indication, the Core Network (CN), such as a Mobility Management Entity (MME), while rejecting the ATTACH may include an alternative redirection information to the MS indicating which network/frequency/PLMN might support RLOS.

According to a possible embodiment for AS search for RLOS availability, the network may broadcast an explicit RLOS support indication stating that RLOS support is available in the network. This explicit RLOS support indication can be valid of all the PLMNs sharing the radio cell. Alternatively, the explicit RLOS support indication can be broadcast for each of the PLMNs sharing the radio cell separately, which can allow per PLMN, such as operator, control of RLOS provisioning. The explicit RLOS support indication, such as a broadcast indication, can be made on SystemInformationBlockType1 or in other subsequent SIB types. The AS in the MS, upon indication from NAS layer, can determine if any PLMN of any of the suitable cell, such as defined in 3GPP TS 36.331-e10, has broadcast support of RLOS information. The result of the cell selection, such as RLOS supported or RLOS not supported, can be indicated to the NAS layer.

According to a possible embodiment, blind RLOS access can be supported by the UE where the blind access can be based on stored information for cell selection, such as based on a previous ATTACH/Registration attempt on a cell from the same PLMN. In this respect, all cells from the same PLMN can be assumed to support or not support RLOS if one of the cells from this PLMN indicated support of RLOS in the recent past during UE/MS mobility there.

According to a possible embodiment, the network can save the signaling load by not broadcasting the RLOS support. In this case the UE/MS can perform an RRC connection establishment procedure with a new establishment cause and the network can reject the RRC connection if it does not support RLOS and/or if it does not understand the new establishment cause. Otherwise, when the network supports RLOS, it can accept the RRC connection request and the NAS procedure can be performed towards an MME/Access Management Function (AMF) that supports RLOS.

In case of manual PLMN selection, the user can select, via a UI, which PLMN to access. In such case, the NAS layer can indicate to the AS layer a requested PLMN selected by the user to be used for cell selection. The RLOS indication can be an optional addition. Upon scanning the broadcasted system information, the AS layer can indicate to the NAS layer whether the requested PLMN supports RLOS access. If the requested PLMN does not support RLOS access, the AS layer can indicate to the NAS layer a list of PLMN(s) supporting RLOS access alongside their measurement values and/or can indicate information, such as charging/billing information, that can help NAS and/or the user to make the PLMN selection choice.

Figure 6:
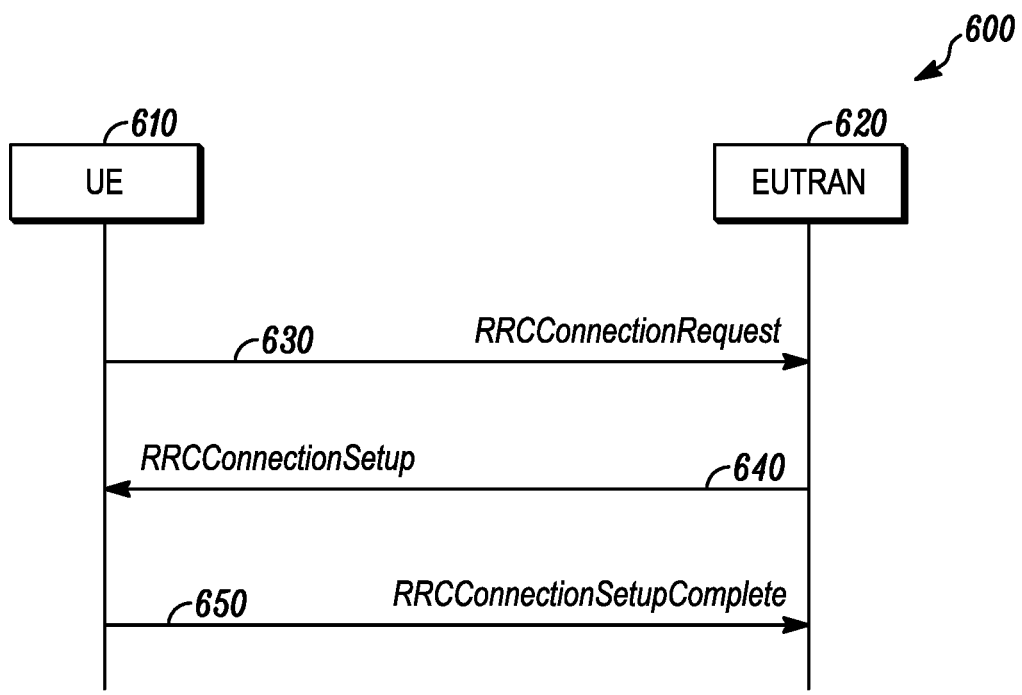
FIG. 6 is an example illustration of a signal flow diagram for RLOS registration with successful Radio Resource Control (RRC) connection establishment according to a possible embodiment.

FIG. 6 is an example illustration of a signal flow diagram 600 for RLOS registration with successful RRC connection establishment according to a possible embodiment. The signal flow diagram 600 shows messages between a UE 610 and an Evolved Universal Mobile Telecommunications System (UMTS) Terrestrial Radio Access Network (EUTRAN) 620, such as a Network Entity (NE) on a network. At 630, a RRCConnectionRequest message can be sent from the UE 610 to the EUTRAN 620. At 640, a RRCConnectionSetup message can be sent from the EUTRAN 620 to the UE 610. At 650, a RRCConnectionSetupComplete message can be sent from the UE 610 to the EUTRAN 620.

For example, after the RLOS discovery, the NAS can trigger a RLOS ATTACH request to the network, such as the EUTRAN 620. To this end, according to a possible embodiment, the NAS can provide a RLOS ATTACH type, a RLOS EstablishmentCause, and/or a dedicated CN identity to the AS layer. For example, the RLOS EstablishmentCause and/or a dedicated CN identity can indicate RLOS access or a RLOS dedicated network, such as using a Dedicated CN Identifier (DCN ID) and/or a new explicit RLOS indication.

The UE 610 can signal this information to the Radio Access Network (RAN) node, such as an eNB or a gNB, of the EUTRAN 620 as a particular parameter or particular Information Element in the RRCConnectionRequest and/or in RRCConnectionSetupComplete message(s).

Based on that, the RAN node can admit the UE 610 and forward the embedded NAS Protocol Data Unit (PDU), such as DedicatedInfoNAS, to an appropriate MME of the EUTRAN 620 based on one or more of the Dedicated Core Network Identity, such as described in TS 23.401, selectedPLMN-Identity and/or RegisteredMME with some specific value like for mmegi and/or mmec, such as defined in 3GPP TS36.331-e30. In this embodiment, the RAN node can use the RRC indication for RLOS access in different ways. For example, the RAN node can use the RRC indication for RLOS access for access admission control, such as when considering overload mechanisms. According to another example, the RAN node can use the RRC indication for RLOS access as input for the core network node selection procedure, such as MME selection.

Since UEs that try RLOS attach are not subscribers to the operator's network, they can be treated with lower priority. Also, Denial of Service (DoS) attacks can be stopped directly at RRC Connection Request level in an eNB. Additionally, if a large number of UEs try to perform a RLOS attach at the same eNB at the same time, different means of de-escalation can be initiated. For example, a back-off timer can be provided in a RRC connection reject or those requests can be ignored. According to a possible embodiment, the network RAN node can provide a dedicated RACH, such as a PRACH Preamble(s) and/or specific time-frequency PRACH resources, for RLOS to separate them from normal service requests.

Figure 7:
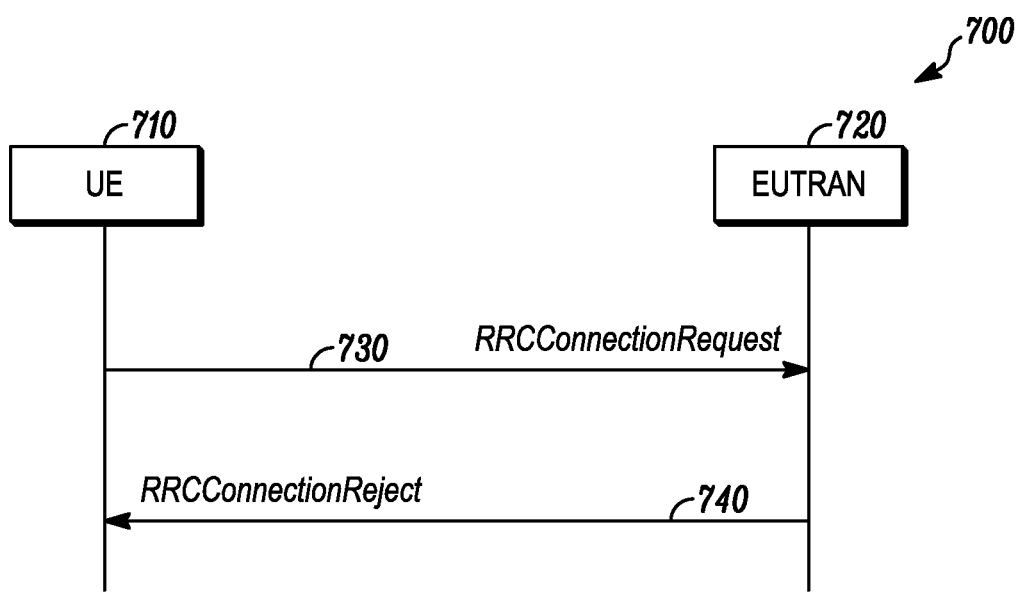
FIG. 7 is an example illustration of a signal flow diagram for RRC network rejection of connection establishment with redirection to a RLOS supporting PLMN and/or frequency according to a possible embodiment.

FIG. 7 is an example illustration of a signal flow diagram 700 for RRC network rejection of connection establishment with redirection to a RLOS supporting PLMN and/or frequency according to a possible embodiment. The signal flow diagram 700 shows messages between a UE 710, such as the UE 110, and a EUTRAN 720, such as a NE on the network 130. At 730, a RRCConnectionRequest message can be sent from the UE 710 to the EUTRAN 720. At 740, a RRCConnectionReject message can be sent from the EUTRAN 720 to the UE 710. For example, a network can reject the RRC connection request based on the RLOS indication in the RRCConnectionRequest message, such as a RLOS EstablishmentCause or Layer-2 logical channel identity, MAC Control Element (CE), or other indication. The network can then optionally redirect the UE, such as an MS, or the ME to a different PLMN/frequency where it can possibly attain the RLOS service. In this case, the appropriate new redirection information may be contained in the RRCConnectionReject message itself.

According to another possible embodiment, a mechanism can be used to control the access to a network for RLOS services. If RLOS is supported by a network, a lot of users may attempt to access/use the radio network. A congested radio network may be required to control such accesses. Since the access class related information, such as including information for Access Class (AC), Extended Access Barring (EAB), Application specific Congestion control for Data Communication (ACDC), etc., can be present in a (U)SIM, a ME or MS with an invalid (U)SIM may be unable to acquire the usual access control as defined in TS 23.122-f00, TS 36.331-e30 etc. To this end, some embodiments can provide the following mechanisms for network access control.

FIG. 8 is an example illustration 800 of a SystemInformationBlockType2 information element according to a possible embodiment. According to this example embodiment for network access control, an explicit indication, such as ac-BarringForRLOS shown in the illustration 800, can be used in a SIB. Based on this RLOS access class for RLOS access, if access barring is set for RLOS services, such as by setting an ac-BarringForRLOS information element to TRUE, then the MS can refrain from initiating RRC Connection request. According to a possible implementation, the ac-BarringForRLOS information can be set per PLMN for the PLMNs sharing a radio cell.

According to another possible embodiment for network access control, a persistence check can be used. For example, a radio network can broadcast a decimal value, such as P, between 0 and 1.0 and the MS, such as a ME if there is no (U)SIM, shall randomly draw a decimal number, such as q, between 0 and 1.0. The access is made only if the q is less than or equal to P. In another possible example, the criteria can be a greater than a relationship between q and P to check the radio access possibility.

According to another possible embodiment for network access control, RLOS-specific access classes can be used. For example, all UEs are presently members of ACs 0 to 9. In addition, UEs may be members of one or more out of 5 special categories, such as ACs 11 to 15, also held in the SIM/USIM. These can be allocated to specific high priority users as follows, where the enumeration is not meant as a priority sequence. AC 15 can be for PLMN staff AC 14 can be for emergency services. AC 13 can be for public utilities, such as water and gas suppliers. AC 12 can be for security services. AC 11 can be for PLMN use.

RLOS-specific service classes can be used for controlling RLOS access from the UEs. These may be outside of the present range of access classes (0-15). These can be, for example, one RLOS service class, AC 16, or more if further granularity for Access Control for RLOS is required. These RLOS access class(es) can be stored in the ME itself and optionally in the (U)SIM card. For RLOS AC(s), their access can be controlled by information elements, such as ac-BarringFactor-RLOS and ac-BarringTime-RLOS. The UE can generate a random number, Rand. The random number generated by the UE may have to pass a persistent test in order for the UE to access RLOS. By setting ac-BarringFactor-RLOS to a lower value, access from a regular user can be restricted until the next attempt after the ac-BarringTime-RLOS time.

Figure 9:
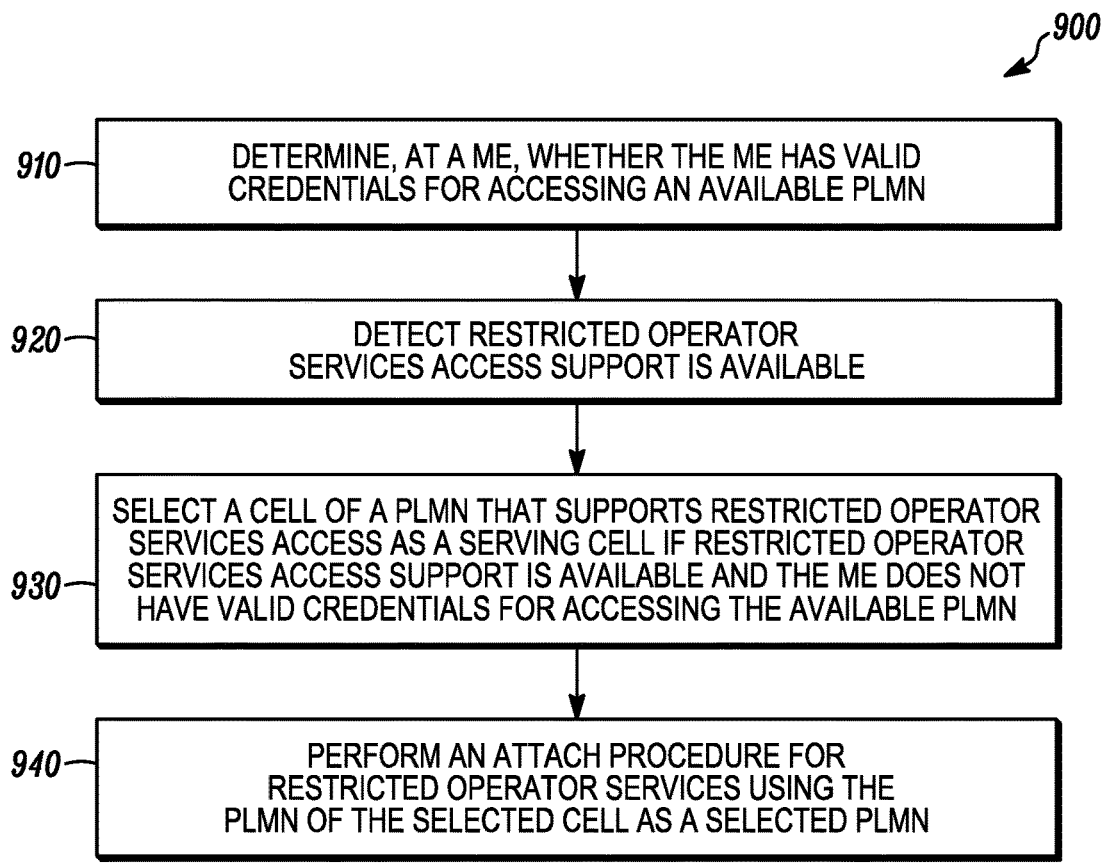
FIG. 9 is an example flowchart illustrating the operation of a wireless communication device according to a possible embodiment.

FIG. 9 is an example flowchart 900 illustrating the operation of a wireless communication device, such as a ME like the UE 110, according to a possible embodiment. At 910, a determination can be made as to whether the ME has valid credentials for accessing an available PLMN. A MS can include a ME and the SIM. A MS can also be considered a UE. The MS and the ME, such as in the case of an IoT device, desktop computer, or other semi-permanent fixture, may not actually be physically mobile in a practical sense, but may be considered a MS or ME because it uses a cellular network used by other MS/MEs. The ME can be determined to not have valid credentials based on a SIM for an available PLMN not being coupled to the ME. The ME can also be determined to not have valid credentials based on a NAS registration failure. For example, there may be a SIM, but the credentials of the SIM may not be valid for an available PLMN, but the ME may not know this until reception of an attach reject message, registration reject message, or other reject message. The ME can further be determined to not have valid credentials based on an attach request being rejected.

For example, the ME can enter a limited service state after receiving the cause of the attach request being rejected and can act appropriately. For example, one cause for entering limited service state can include failure to find a suitable cell of the selected PLMN. Another cause of entering limited service state can include no SIM in the MS. Another cause of entering limited service state can include a "PLMN not allowed" response in a received Location Registration (LR) reject message or attach reject message. Another cause of entering limited service state can include an "illegal MS" or "illegal ME" response in a received LR reject message. Any SIM in the ME can then be considered "invalid." Another cause of entering limited service state can include an "IMSI unknown in Home Location Register (HLR)" response in a received LR reject message. Any SIM in the ME can then be considered "invalid" for non-General Packet Radio Service (GPRS) services. Another cause of entering limited service state can include a "GPRS services not allowed" response in a LR reject message of a GPRS MS attached to GPRS services only being received. The cell selection state of GPRS MSs attached to GPRS and non-GPRS can depend on the outcome of the location updating. A similar situation can include an "EPS services not allowed" response received when an EPS attach, tracking area update, or service request is performed. Another cause of entering limited service state can include a PSM being activated, such as described in 3GPP TS 23.682.

At 920, availability of restricted operator services access support can be detected. Restricted operator services can be RLOS, can be PARLOS-based services, can be services that are not available to users that do not have valid credentials for a given network, and/or can be any other restricted operator service that requires valid credentials for accessing a network. For example, the ME can be in a limited service state, where it may only use emergency services, but not restricted operator services like voice calls, text messaging, internet applications, and other restricted operator services that require valid credentials. Thus, restricted operator services access support provides access to operator services that otherwise require valid credentials. At 930, a cell of a PLMN that supports restricted operator services access can be selected as a serving cell if restricted operator services access support is available and the ME does not have valid credentials for accessing the available PLMN.

At 940, an attach procedure can be performed for restricted operator services using the PLMN of the selected cell as a selected PLMN. The attach procedure can be an EPS attach procedure, a registration procedure such as in a 5G System, a restricted operator access attach procedure, or any other attach procedure.

Performing the attach procedure for restricted operator services can include performing a restricted operator services access RRC connection establishment procedure for restricted operator services access and determining restricted operator services access is at least temporarily not available if the RRC connection establishment procedure is rejected by the PLMN. For example, a NAS layer can generate a NAS attach request message including a RLOS indication. The NAS layer can send the NAS attach request message to the RRC layer and the RRC layer can initiate an RRC connection establishment procedure with the RLOS indication in an RRC connection establishment request message.

Performing the attach procedure for restricted operator services can also include signaling information of restricted operator services access to the selected PLMN. For example, the information of restricted operator services access can be sent in an attach request message used by an MME following after RRC establishment is successful. It can also be sent in a RRCConnectionRequest message that can be used by a base station. It can also be in both messages.

According to a possible embodiment, a SIB information element indicating restricted operator services access is barred can be received. Performing the attach procedure for restricted operator services can be refrained from if restricted operator services access is barred.

As a further example, the ME can initiate an RRC connection establishment with a RAN node, such as an NE, a base station, an eNB, a gNB, an access point, or other RAN node, by using an RRC RLOS indication. After receiving the RRC RLOS indication, the RAN node can accept or reject the request based on overload situation and/or the RAN node can select an appropriate MME for RLOS operation.

To elaborate on a possible embodiment, the information of RLOS can be signaled in a RLOS indication, such as an RRC indication for RLOS access, that can indicate RLOS access and/or a RLOS dedicated network. The ME can signal this information to a RAN node, such as a base station, of the PLMN as a new parameter or new information element in RRCConnectionRequest and/or in RRCConnectionSetupComplete message(s). The RAN node can use the RRC indication for RLOS access for access admission control, such as considering overload mechanisms. The RAN node can also use the RRC indication for RLOS access as input for the core network node selection procedure, such as MME selection, and/or for other purposes. The PLMN can reject the RRC Connection Request based on the RLOS indication in the RRCConnectionRequest message and can optionally redirect the ME to a different PLMN/frequency where it can possibly attain the RLOS service.

According to another possible embodiment, the attach procedure for restricted operator services can be performed by sending an attach request indicating the attachment is for restricted operator services access. For example, the MS can already indicate to the MME the RLOS support capability while trying an initial normal ATTACH procedure. For example, after the RLOS discovery, the NAS can trigger a RLOS ATTACH request to the network, such as a EUTRAN. To this end, according to a possible implementation, the NAS can provide a RLOS ATTACH type, a RLOS EstablishmentCause, and/or a dedicated CN identity to the AS layer. For example, the RLOS EstablishmentCause and/or a dedicated CN identity can indicate RLOS access or a RLOS dedicated network, such as using a DCN ID and/or a new explicit RLOS indication.

According to a possible embodiment, a decimal number can be received from the PLMN. A random decimal number can be determined. A relationship between the random decimal number and the received decimal number can be determined. The attach procedure for restricted operator services can be performed based on the relationship between the random decimal number and the received decimal number.

For example, the attach procedure for restricted operator services can be performed if the random decimal number is greater than the received decimal number. The random decimal number can be a persistence value broadcasted by a base station. To elaborate, a radio network can broadcast a decimal value between 0 and 1.0 called P and the MS can randomly draw a decimal number called q between 0 and 1.0. The access may be made only if q is less than or equal to P. In another possible example, the criteria could also be a greater than a relationship between q and P to check the radio access possibility.

According to a possible embodiment, the ME can be a member of a RLOS access class. Performing the attach procedure for restricted operator services can then include performing the attach procedure for restricted operator services only if the ME is a member of a RLOS access class and the RLOS access class is not barred as broadcast in the system information of the selected cell of the PLMN. The RLOS access class can be stored in UE memory, stored on a subscriber identify module, or otherwise stored on the UE.

The access can be controlled by ac-BarringFactor-RLOS and ac-BarringTime-RLOS. The ME can generate a random number that has to pass a persistent test in order for the ME to access RLOS on the PLMN. By setting ac-BarringFactor-RLOS to a lower value, the access from regular user can be restricted until the next attempt after the ac-BarringTime-RLOS time.

According to a possible embodiment, restricted operator services access support information can be stored in the ME for a cell, a frequency, and/or a PLMN. For example, RLOS support information can be stored in the ME for multiple cells, frequencies, and/or PLMNs. The RLOS support information can be pre-stored, can be based on a previous attach attempt on a cell from the same PLMN, can be based on received information, and/or can be otherwise stored.

According to a possible embodiment, at least one available PLMN for RLOS availability can be searched for if a valid SIM is not available. According to another possible embodiment, an indication that indicates RLOS is available can be received, where detecting at 920 can include detecting RLOS support is available based on receiving the indication that indicates RLOS is available. The indication can be received from an AS layer and the indication can provide at least one PLMN that supports RLOS access. The indication can also provide other information, such as measurement values, billing information, and/or other information, that can help a NAS and/or a user make a PLMN selection.

According to a possible embodiment, a broadcasted system information message can be received. The broadcasted system information message can include a restricted operator services access indication from a network entity of the PLMN. The restricted operator services access indication can indicate the PLMN supports restricted operator services access. The broadcasted system information message including the restricted operator services access indication can be received at a AS layer of the ME. The restricted operator services access indication can be sent from the AS layer to a NAS layer of the ME. Then, detecting restricted operator services access support is available at 920 can be based on the broadcasted system information message including the restricted operator services access indication indicating the PLMN supports restricted operator services access. According to a possible implementation, the AS layer of the ME can detect restricted operator services access support on the PLMN is available based on the broadcasted system information message including the restricted operator services access indication indicating the PLMN supports restricted operator services access.

Also, selecting the cell of the PLMN can include selecting the cell of the PLMN based on the broadcasted system information message including the restricted operator services access indication indicating the PLMN supports restricted operator services access. According to a possible implementation, the AS layer can select the cell of a PLMN that supports restricted operator services access as a serving cell if restricted operator services access support is available. An indication of the selected cell can be sent from the AS layer to the NAS layer.

For example, a broadcasted system information message, which can be part of a new SIB or an existing SIB, can be modified to include a RLOS indication indicating that the PLMN supports RLOS. This modified broadcasted system information message can be used by the UE to determine that the PLMN supports RLOS. Also, the PLMN selection can be based on this modified broadcasted system information message.

To elaborate, according to a possible embodiment for AS search for RLOS availability, a network may broadcast an explicit RLOS support indication stating that RLOS support is available in the network. This explicit RLOS support indication can be valid of all the PLMNs sharing the radio cell. Alternatively, the explicit RLOS support indication can be broadcast for each of the PLMNs sharing the radio cell separately, which can allow per PLMN, such as operator, control of RLOS provisioning. The explicit RLOS support indication, such as a broadcasted indication, can be made on the SystemInformationBlockType1 or in other subsequent SIB Types. The AS in the MS, upon indication from NAS layer, can determine if any PLMN of any of the suitable cell, such as defined in 3GPP TS 36.331-e10, has broadcast support of RLOS information. The result of the cell selection, such as whether RLOS supported or RLOS not supported, can be indicated to the NAS layer. A list of all PLMNs can be broadcast in, for example, SIB Type1 including PLMNs belonging to a plurality of new/separate/independent cellIdentity(s) as defined in SystemInformationBlockType1 of 3GPP TS 36.331 supporting RLOS.

According to a possible embodiment, user input can be utilized at different stages of the process. For example, user input can be requested as to whether to use restricted operator services access. User input enabling the use of restricted operator services access can be received in response to requesting the user input. The cell of the PLMN that supports restricted operator services access can be selected as a serving cell if restricted operator services access support is available and if the received user input enables the use of restricted operator services access. The user input can be requested after detecting restricted operator services access support is available. The user input can also be requested before searching for restricted operator services access availability and searching can include searching for restricted operator services access availability if the ME does not have valid credentials for accessing the available PLMN and if the received user input enables the use of restricted operator services access.

According to another possible implementation of utilizing user input, restricted operator services access can be detected to be available on more than one available PLMN. User input can be requested as to which PLMN to use for restricted operator services access. User input indicating which PLMN to use for restricted operator services access can be received. The cell of the PLMN can be selected based on the user input indicating which PLMN to use for restricted operator services access. A PLMN to use for restricted operator service access can also be configured, such as stored, in the USIM, configured in the UE/ME, provided by the network, or otherwise provided, such as for automatic PLMN selection.

Figure 10:
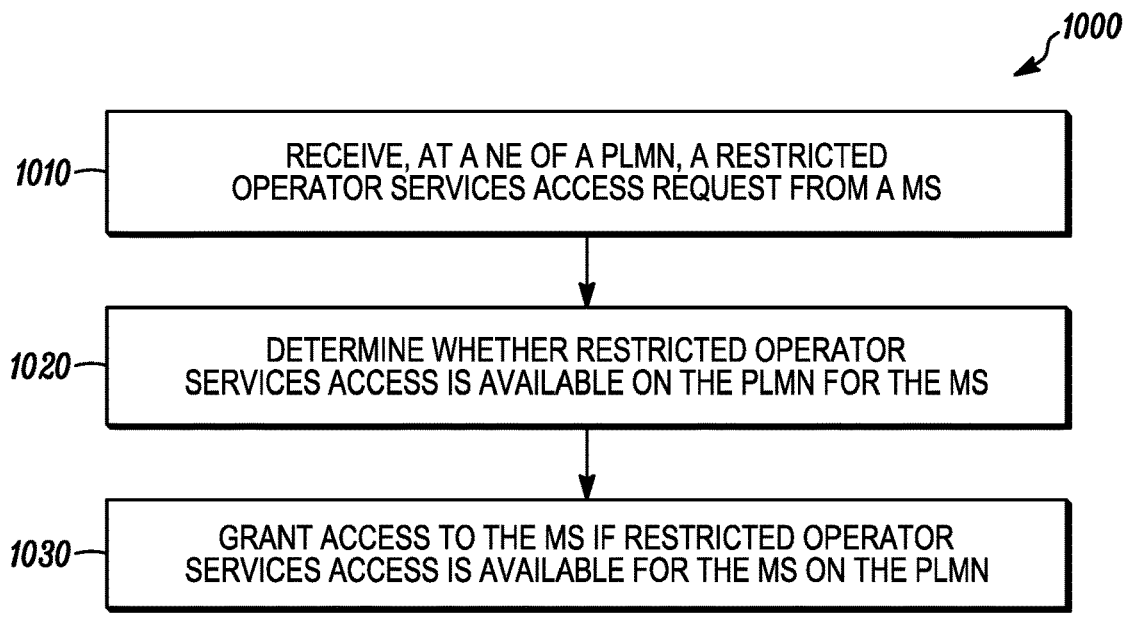
FIG. 10 is an example flowchart illustrating the operation of a wireless communication device according to a possible embodiment.

FIG. 10 is an example flowchart 1000 illustrating the operation of a wireless communication device, such as a NE like the base station 120 or other entity on the network 130, according to a possible embodiment. At 1010, a restricted operator services access request can be received, at the NE of a PLMN, from a MS. According to a possible embodiment, the restricted operator services access request can be an RRC connection establishment message. The RRC connection establishment message can include the restricted operator services access request. The RRC connection establishment message can be an RRC connection request message and/or an RRC connection setup complete message. The RLOS request can be a particular parameter or particular Information Element in the RRCConnectionRequest and/or in RRCConnectionSetupComplete message(s).

According to a possible embodiment, access admission control can be performed to determine whether to grant the MS access based on the restricted operator services access request. According to another possible embodiment, an RRC connection reject message including a back-off timer can be sent if restricted operator services access is not available for the MS on the PLMN.

According to a possible embodiment, the restricted operator services access request can include a restricted operator services access attach type, a restricted operator services access establishment cause, a restricted operator services access core network identity identifying the core network for restricted operator services access, and/or any other restricted operator services access request. For example, a RLOS EstablishmentCause and/or a dedicated CN identity can indicate RLOS access or a RLOS dedicated network, such as using a DCN ID and/or a new explicit RLOS indication.

According to a possible embodiment, the RRC connection establishment message can be a NAS attach request message. The NAS attach request message can be included in an RRCConnectionSetupComplete message. The NAS attach request message can be forwarded to a MME based on information in the restricted operator services access request. The information in the restricted operator services access request can include a restricted operator services access dedicated core network identity identifying a restricted operator services access core network of the MME, a restricted operator services access PLMN identity identifying a PLMN of the MME, a restricted operator services access registered MME, and/or other information in a restricted operator services access request.

For example, based on a RLOS access request, a RAN node can admit the UE and forward the embedded NAS Protocol Data Unit (PDU), such as DedicatedInfoNAS, to an appropriate MME based on one or more of the Dedicated Core Network Identity, such as described in TS 23.401, selected PLMN-Identity, and/or RegisteredMME with some specific value like for mmegi and/or mmec, such as defined in 3GPP TS 36.331-e30.

According to a possible embodiment, CN entity selection can be performed based on the restricted operator services access request. A CN entity can be an MME, can be an AMF, can be a Serving GPRS Support Node (SGSN) for UMTS, or can be any other CN entity. In this embodiment, the RAN node can use the RRC indication for RLOS access in different ways. For example, the RAN node can use the RRC indication for RLOS access for access admission control, such as when considering overload mechanisms. According to another example, the RAN node can use the RRC indication for RLOS access as input for the core network node selection procedure, such as MME selection.

At 1020 a determination can be made as to whether restricted operator services access is available on the PLMN for the MS. The restricted operator services access can be determined to not be available based on restricted operator services access not being available at all on a PLMN of the NE. When restricted operator services access is determined to not be available on a PLMN of the NE, the MS can be sent information about another resource where restricted operator services access is available. For example, the other resource can be another PLMN, can be another cell, can be another base station, can be another frequency, or can be any other resource that can provide RLOS.

At 1030, restricted operator services access can be granted to the MS if restricted operator services access is available for the MS on the PLMN. Granting access can include determining a load condition and granting access to the MS if restricted operator services access is available based on the load condition. The load condition can be a load condition of the NE, can be a load condition of a network, and/or can be any other load condition of a number of users accessing a network. The restricted operator services access can also be determined to not be available based on the MS being a member of a particular access class.

According to a possible embodiment, a broadcasted system information message can be transmitted. The broadcasted system information message can include an indication that indicates the PLMN supports restricted operator services access. According to a possible implementation, the broadcasted system information message can be sent in a SIB. For example, a list of all PLMNs broadcasted in, for example, SIB Type1 including PLMNs belonging to a plurality of new/separate/independent cellIdentity(s) as defined in SystemInformationBlockType1 of 3GPP TS 36.331 supporting RLOS. The explicit RLOS support indication, such as a broadcast indication, can be made on the SystemInformationBlockType1 or in other subsequent SIB types.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 11:
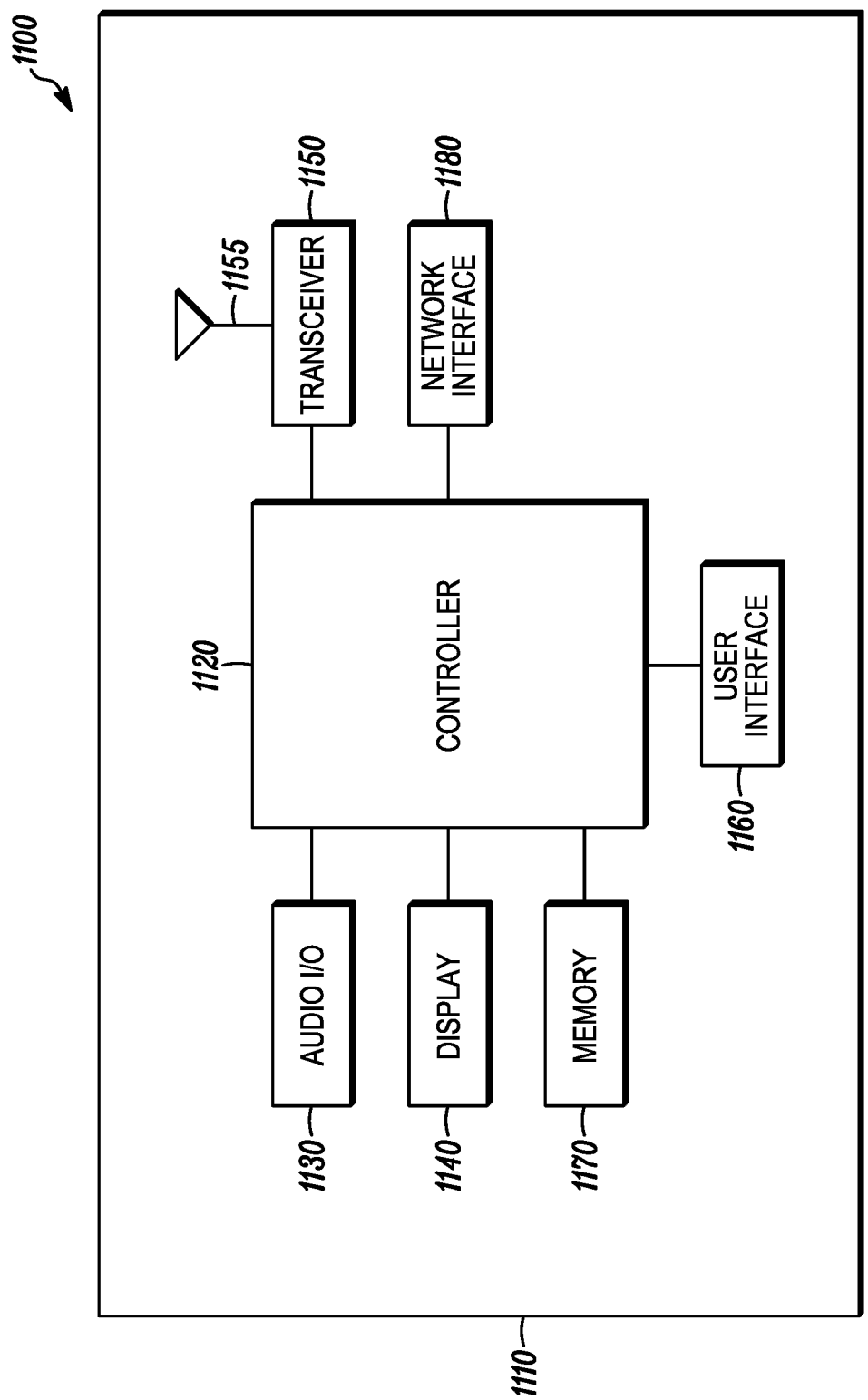
FIG. 11 is an example block diagram of an apparatus according to a possible embodiment.

FIG. 11 is an example block diagram of an apparatus 1100, such as the UE 110, the base station 120, a NE, and/or any other device disclosed herein, according to a possible embodiment. The apparatus 1100 can include a housing 1110, a controller 1120 coupled to the housing 1110, audio input and output circuitry 1130 coupled to the controller 1120, a display 1140 coupled to the controller 1120, a transceiver 1150 coupled to the controller 1120, an antenna 1155 coupled to the transceiver 1150, a user interface 1160 coupled to the controller 1120, a memory 1170 coupled to the controller 1120, and a network interface 1180 coupled to the controller 1120. The apparatus 1100 can perform the methods described in all the embodiments.

The display 1140 can be a viewfinder, a Liquid Crystal Display (LCD), a Light Emitting Diode (LED) display, a plasma display, a projection display, a touch screen, or any other device that displays information. The transceiver 1150 can include a transmitter and/or a receiver. The audio input and output circuitry 1130 can include a microphone, a speaker, a transducer, or any other audio input and output circuitry. The user interface 1160 can include a keypad, a keyboard, buttons, a touch pad, a joystick, a touch screen display, another additional display, or any other device useful for providing an interface between a user and an electronic device. The network interface 1180 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1170 can include a random access memory, a read only memory, an optical memory, a solid state memory, a flash memory, a removable memory, a hard drive, a cache, or any other memory that can be coupled to an apparatus.

The apparatus 1100 or the controller 1120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1170 or elsewhere on the apparatus 1100. The apparatus 1100 or the controller 1120 may also use hardware to implement disclosed operations. For example, the controller 1120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1120 may be any controller or processor device or devices capable of operating an apparatus and implementing the disclosed embodiments. Some or all of the additional elements of the apparatus 1100 can also perform some or all of the operations of the disclosed embodiments.

In operation as a UE according to a possible embodiment, the transceiver 1150 can transmit and receive signals. The controller 1120 can determine whether the apparatus 1100 has valid credentials for accessing an available PLMN. The controller 1120 can determine the apparatus 1100 does not have valid credentials based on determining a SIM for an available PLMN is not coupled to the apparatus 1100. The controller 1120 can also determine the apparatus 1100 does not have valid credentials based on a NAS registration failure. The controller 1120 can further determine the apparatus 1100 does not have valid credentials based on an attach request being rejected. The controller 1120 can determine the apparatus 1100 does not have valid credentials for any other reason for not having valid credentials.

The controller 1120 can detect restricted operator services access support is available. The controller 1120 can select a cell of a PLMN that supports restricted operator services access as a serving cell if restricted operator services access support is available and the apparatus 1100 does not have valid credentials for accessing the available PLMN.

The controller 1120 can perform, via the transceiver 1150, an attach procedure for restricted operator services using the PLMN of the selected cell as a selected PLMN. According to a possible embodiment, the controller 1120 can perform the attach procedure for restricted operator services by performing a restricted operator services access RRC connection establishment procedure for restricted operator services access services and by determining restricted operator services access is at least temporarily not available if the RRC connection establishment procedure is rejected by the PLMN.

According to a possible implementation, the transceiver 1150 can receive a broadcasted system information message including a restricted operator services access indication from a network entity of the PLMN. The restricted operator services access indication can indicate the PLMN supports restricted operator services access. The controller 1120 can detect restricted operator services access support on the PLMN is available based on the broadcasted system information message including the restricted operator services access indication indicating the PLMN supports restricted operator services access. The controller 1120 can select the cell of the PLMN based on the broadcasted system information message including the restricted operator services access indication indicating the PLMN supports restricted operator services access.

In operation as a NE according to a possible embodiment, the transceiver 1150 can transmit a broadcasted system information message including an indication that indicates the PLMN supports restricted operator services access. The transceiver 1150 can receive a restricted operator services access request from a MS. The restricted operator services access request can be an RRC connection establishment message. The RRC connection establishment message can include the restricted operator services access request. According to a possible implementation, the RRC connection establishment message can be a NAS attach request message.

The controller 1120 can forward the NAS attach request message to an MME based on information in the restricted operator services access request. The information in the restricted operator services access request can include a restricted operator services access dedicated core network identity identifying a restricted operator services access core network of the MME, a restricted operator services access PLMN identity identifying a PLMN of the MME, a restricted operator services access registered MME, and/or other information.

The controller 1120 can determine whether restricted operator services access is available on the PLMN for the MS. According to a possible implementation, the controller 1120 can determine a load condition and determine whether restricted operator services access is available based on the load condition. The controller 1120 can grant access to the MS if restricted operator services access is available for the MS on the PLMN. According to a possible implementation, the controller 1120 can perform access admission control to determine whether to grant the MS access based on the restricted operator services access request.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

List of Abbreviations

| Abbreviation | Description |
| --- | --- |
| AAA | Authentication, Authorization, and Accounting |
| ACB | Access Class Baring |
| AMF | Access and Mobility Management Function |
| AP | Access Point |
| AuC | Authentication Centre |
| BS | Base Station |
| DRB | Data Radio Bearer |
| eNB | Evolved Node-B |
| gNB | 5G Node-B |
| GPRS | General Packet Radio Service |
| GSM | Global System for Mobile Communications |
| HSS | Home Subscriber Server |
| ID | Identity |
| IE | Information Element |
| LTE | Long Term Evolution |
| MME | Mobility Management Entity |
| NAS | Non Access Stratum |
| Network Slice (Slice) | A logical network that provides specific network capabilities and network characteristics |
| NH | Next Hop |
| NR | New Radio |
| OAM | Operation and Maintenance System |
| OMA DM | Open Mobile alliance Device Management |
| PCI | Physical Cell Identity |
| RAN | Radio Access Network |
| RLOS | Restricted Local Operator Services |
| RRC | Radio Resource Control |
| SIB | System Information Block |
| SRB | Signaling Radio Bearer |
| TA | Tracking Area |
| TSS | Temporary Subscriber Server |
| UDM | Unified Data Management |
| UDR | User Data Repository |
| UE | User Equipment |
| UICC | Universal Integrated Circuit Card |
| UMTS | Universal Mobile Telecommunication System |
| UP | User Plane |
| (U)SIM | UMTS Subscriber Identification Module |
| UTC | Universal Time Coordinated |
| VPLMN | Visited Public Land Mobile Network |
| MS | Mobile Station. The present document makes no distinction between MS and UE. |
| ME | Mobile Equipment, MS without a valid SIM/USIM |
| LR | Location Registration |

We claim:

1. A method comprising:
receiving, at a mobile equipment, a user request for a restricted operator service;
receiving a broadcasted system information message including a restricted operator service access indication from a serving cell of a network;
sending the restricted operator service access indication from an access stratum layer to a non-access stratum layer of the mobile equipment;
detecting the restricted operator service access support is available in the serving cell based on the restricted operator service access indication;
determining, at the mobile equipment, to attach to the network supporting restricted operator service based on the user request; and
performing a radio resource control connection establishment procedure to transmit an attach request message, where the radio resource control connection establishment procedure is for the restricted operator service access, and where the radio resource control connection establishment procedure includes transmitting a RRC-ConnectionSetupComplete message from the mobile equipment to the network,
wherein the RRCConnectionSetupComplete message includes both a restricted operator service request and an attach request message including a restricted operator service attach type.

2. The method according to claim 1, wherein determining whether the mobile equipment has valid credentials comprises determining the mobile equipment does not have valid credentials based on determining a subscriber identity module for an available public land mobile network is not coupled to the mobile equipment.

3. The method according to claim 1, wherein determining whether the mobile equipment has valid credentials comprises determining the mobile equipment does not have valid credentials based on a non-access stratum registration failure.

4. The method according to claim 1, wherein determining whether the mobile equipment has valid credentials comprises determining the mobile equipment does not have valid credentials based on an attach request being rejected.

5. The method according to claim 1, wherein performing the attach procedure for restricted operator service using the public land mobile network of the selected cell as a selected public land mobile network comprises signaling information of restricted operator service access to the selected public land mobile network.

6. The method according to claim 1, further comprising:
requesting user input as to whether to use restricted operator service access; and
receiving user input enabling the use of restricted operator service access in response to requesting the user input,
wherein selecting a cell of public land mobile network comprises selecting a cell of a public land mobile network that supports restricted operator service access as a serving cell if restricted operator service access support is available and if the received user input enables the use of restricted operator service access.

7. The method according to claim 1,
wherein detecting comprises detecting restricted operator service access is available on more than one available public land mobile network,
wherein the method comprises:
requesting user input as to which public land mobile network to use for restricted operator service access;
receiving user input indicating which public land mobile network to use for restricted operator service access, and
wherein selecting comprises selecting a cell of the public land mobile network based on the user input indicating which public land mobile network to use for restricted operator service access.

8. The method according to claim 1, further comprising:
receiving a system information block information element indicating restricted operator service access is barred; and
refraining from performing the attach procedure for restricted operator service if restricted operator service access is barred.

9. The method according to claim 1, further comprising:
receiving a decimal number from the public land mobile network; and
determining a random decimal number,
wherein performing the first attach procedure for restricted operator service comprises performing the first attach procedure for restricted operator service based on a relationship between the random decimal number and the received decimal number.

10. The method according to claim 1, wherein performing the attach procedure for restricted operator service comprises sending an attach request indicating the attachment is for restricted operator service access.

11. The method according to claim 1, wherein the method further comprises assuming restricted operator service access is supported on other serving cells on the same network based on detecting the restricted operator service access support is available in the serving cell of the network.

12. The method according to claim 1, further comprising receiving dedicated restricted operator service random access channel information, where the dedicated restricted operator service random access channel information is for a random access channel dedicated to restricted operator service,
wherein performing the first attach procedure comprises performing the first attach procedure using the random access channel dedicated to restricted operator service.

13. The method according to claim 1, wherein the non-access stratum layer triggers the access stratum layer to establish a radio resource control connection for restricted operator service access.

14. The method according to claim 1,
wherein the restricted operator service request is processed by a base station, and
wherein the attach request message is processed by a mobility management entity.

15. An apparatus comprising:
a user interface that receives a user request for restricted operator services;
a transceiver that receives a broadcasted system information message including a restricted operator service access indication from a serving cell of a network; and
a controller coupled to the transceiver, where the controller
sends the restricted operator service access indication from an access stratum layer to a non-access stratum layer of the apparatus,
detects the restricted operator service access support is available in the serving cell based on the restricted operator service access indication,
determines to attach to the network supporting the restricted operator service based on the user request, and
wherein the controller performs a radio resource control connection establishment procedure to transmit the attach request message, where the radio resource control connection establishment procedure is for the restricted operator service access, and where the radio resource control connection establishment procedure includes transmitting, via the transceiver, a RRCConnectionSetupComplete message, and
wherein the RRCConnectionSetupComplete message includes both a restricted operator service request and an attach request message including a restricted operator service attach type.

16. The apparatus according to claim 15, wherein the controller determines the apparatus does not have valid credentials based on determining a subscriber identity module for an available public land mobile network is not coupled to the apparatus.

17. The apparatus according to claim 15, wherein the controller determines the apparatus does not have valid credentials based on a non-access stratum registration failure.

18. The apparatus according to claim 15, wherein the controller determines the apparatus does not have valid credentials based on an attach request being rejected.

19. The apparatus according to claim 15, wherein the non-access stratum layer triggers the access stratum layer to establish a radio resource control connection for restricted operator service access.

20. The apparatus according to claim 15,
wherein the restricted operator service request is processed by a base station, and
wherein the attach request message is processed by a mobility management entity.

* * * * *